July 16, 1929.  A. A. ANGELL  1,721,062
MEANS FOR MAKING CYLINDRICAL BRUSHES
Filed April 30, 1925   12 Sheets-Sheet 5
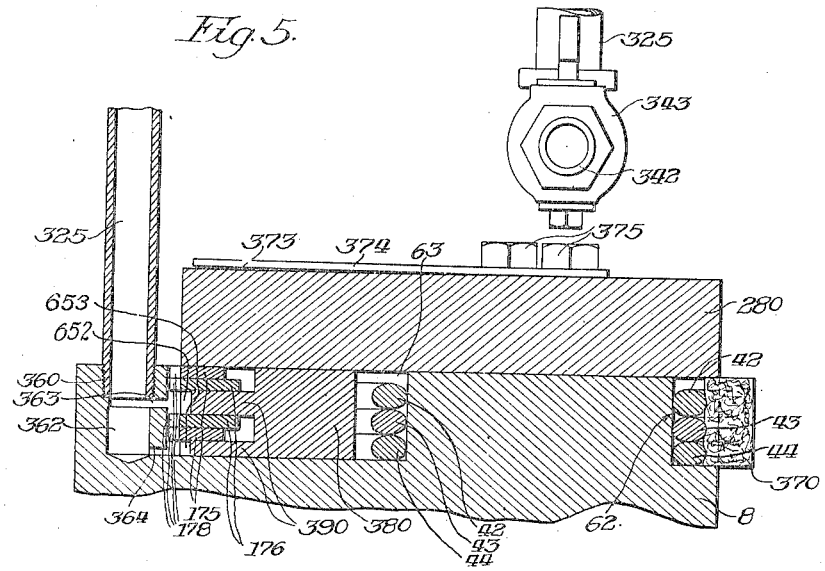
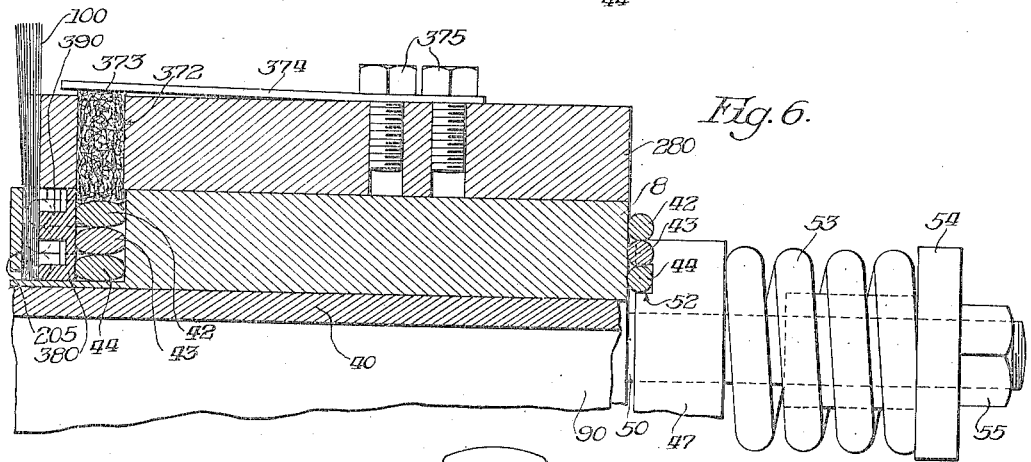
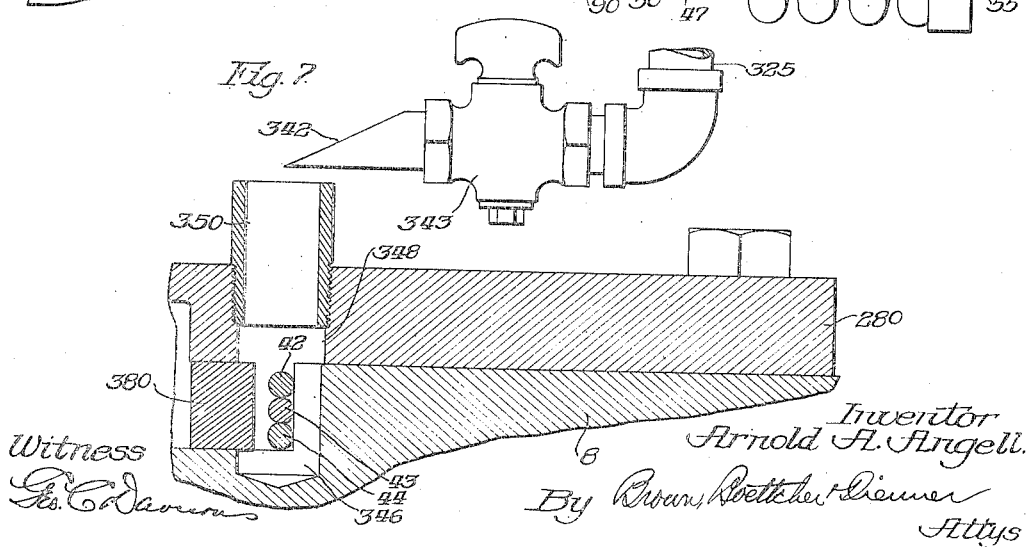

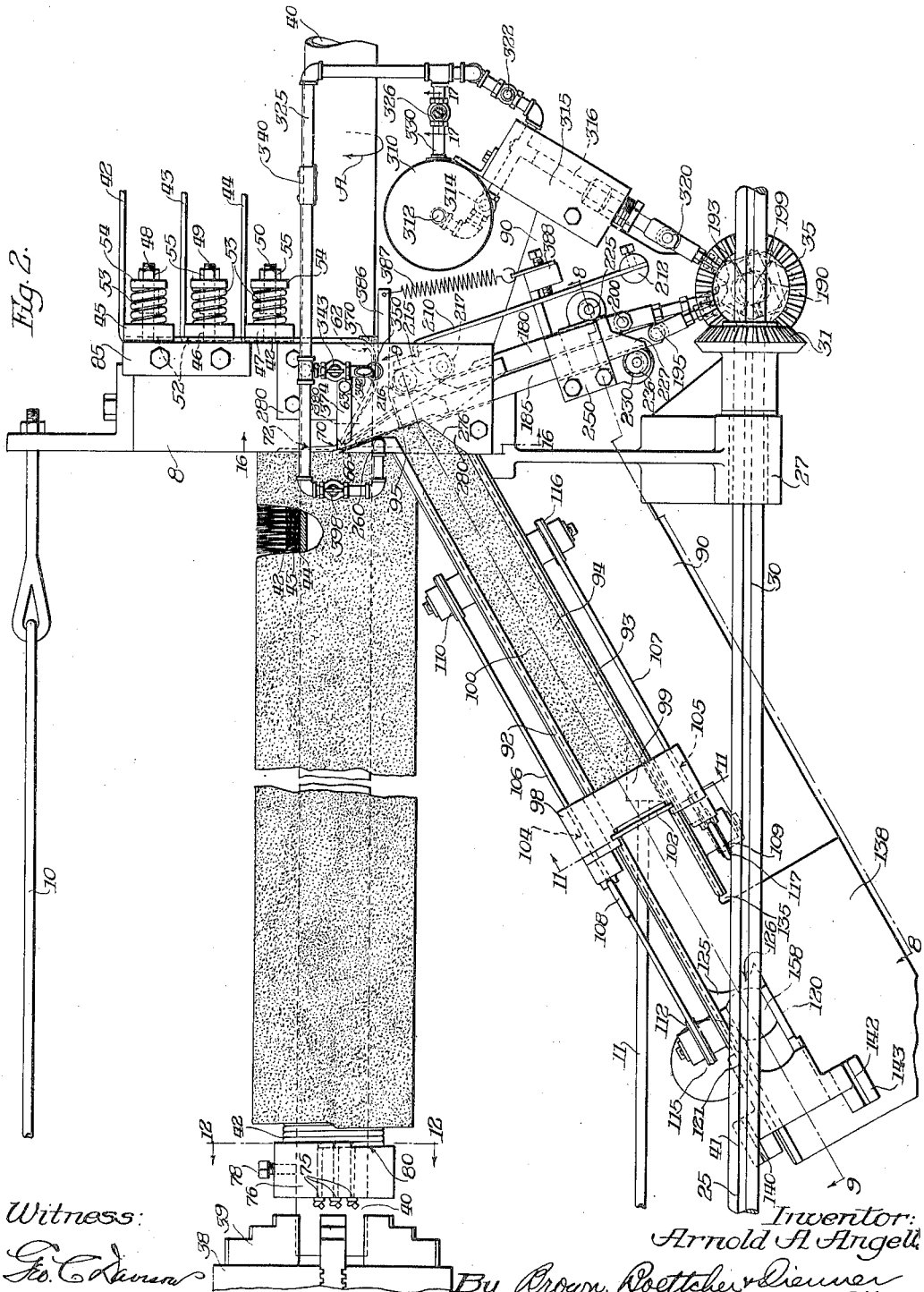

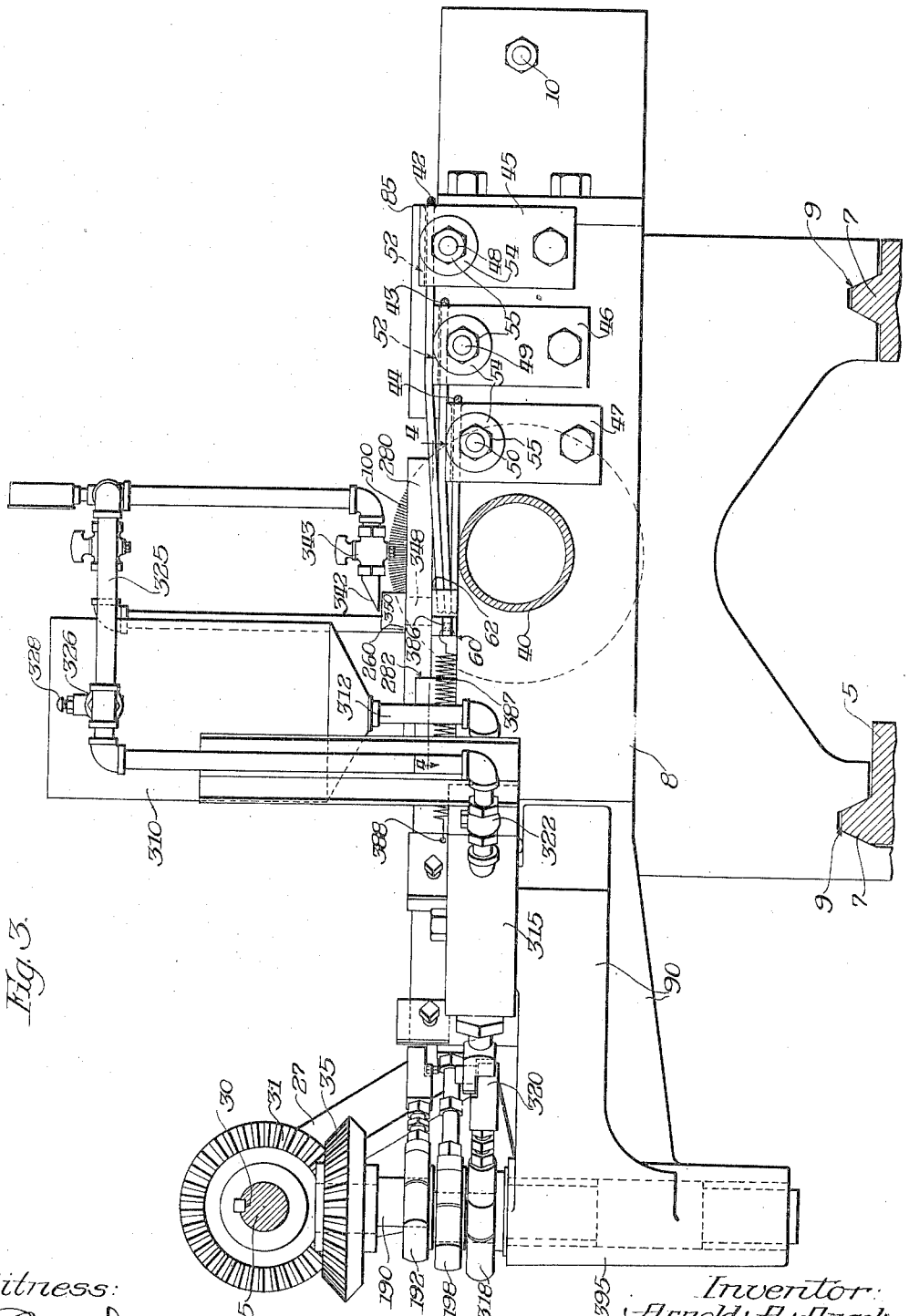

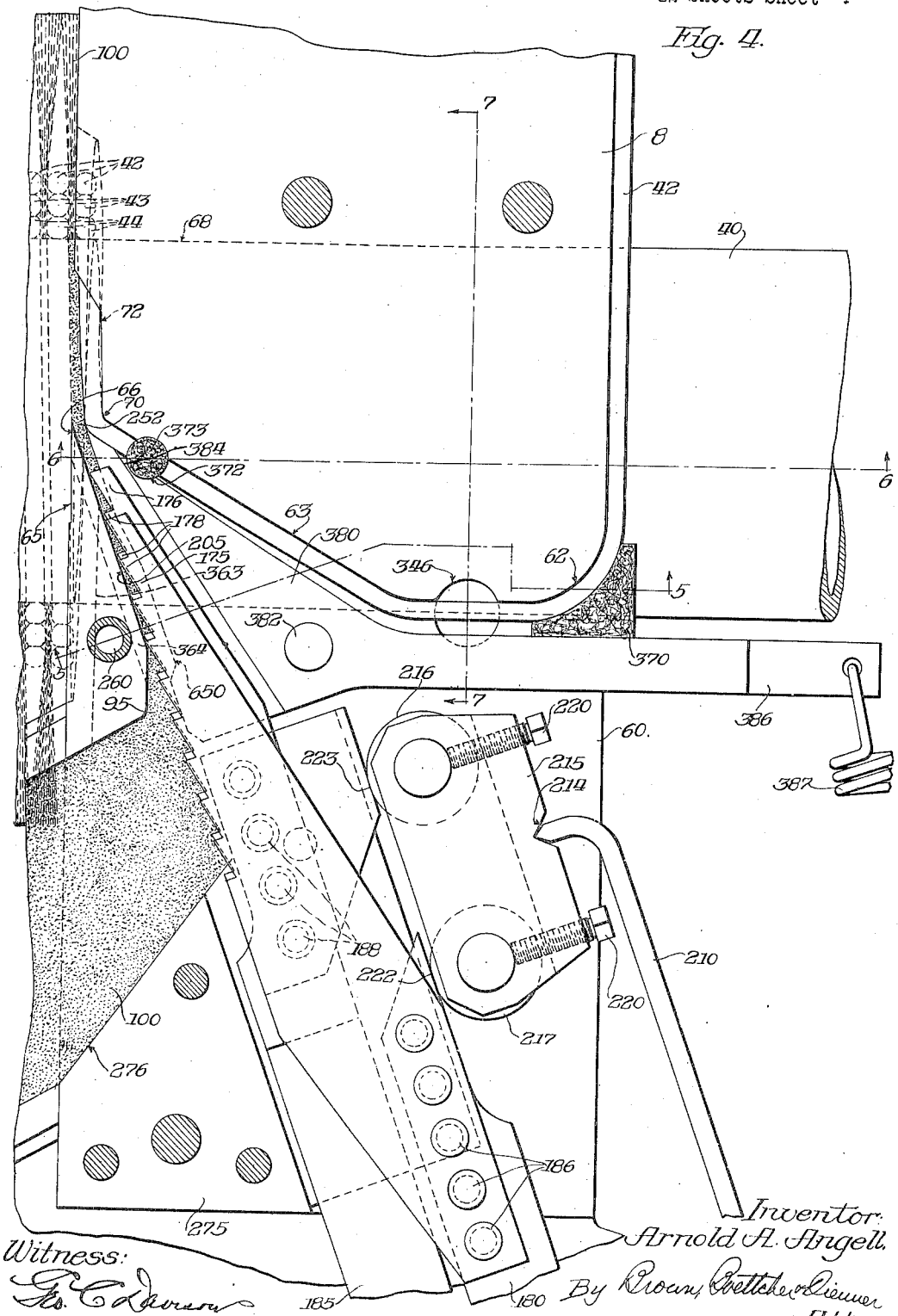

July 16, 1929.  A. A. ANGELL  1,721,062
MEANS FOR MAKING CYLINDRICAL BRUSHES
Filed April 30, 1925   12 Sheets-Sheet 6
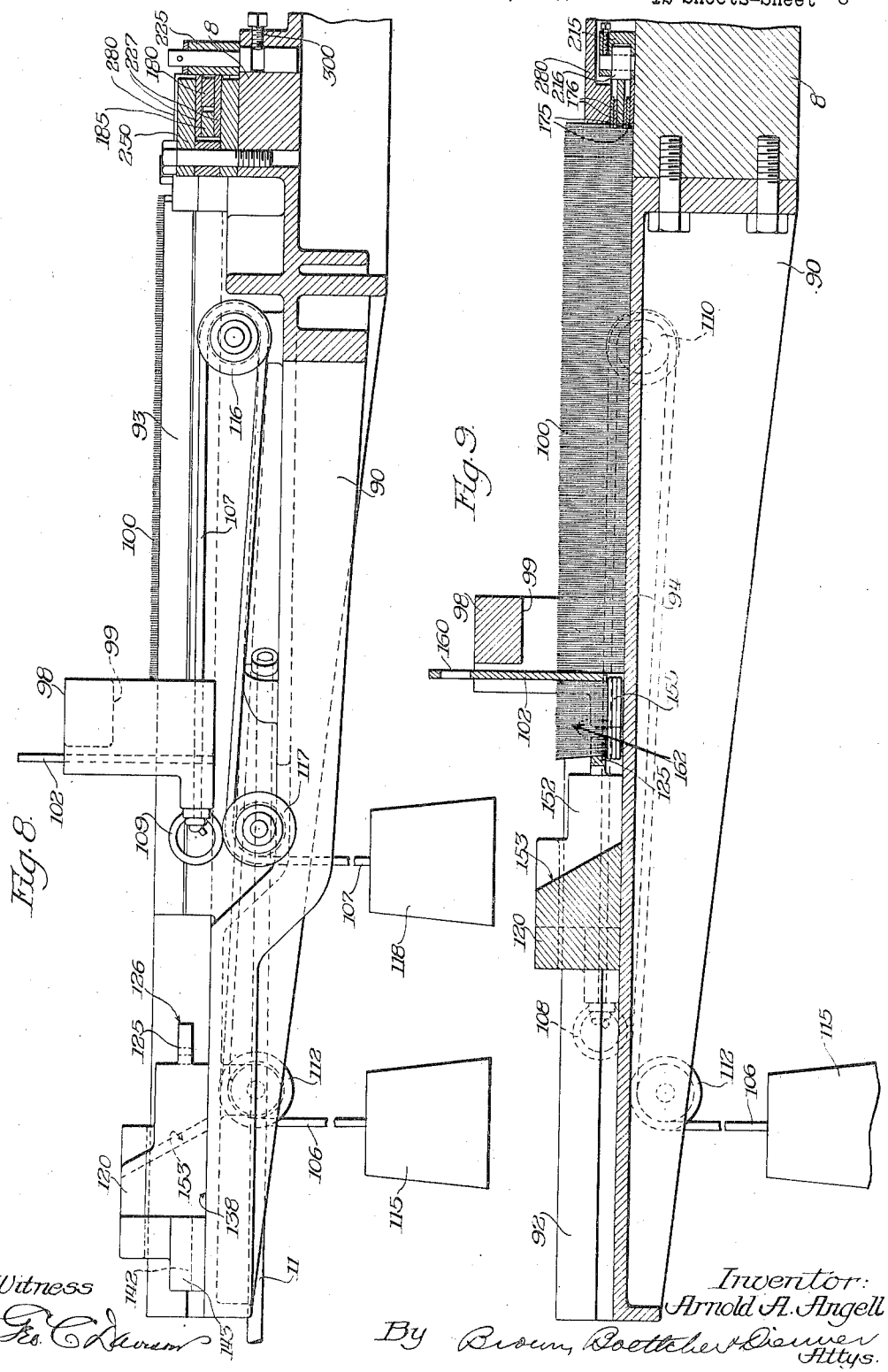
Witness
Geo. C. Dawson
Inventor:
Arnold A. Angell
By Brown, Boettcher & Dawson
Attys.

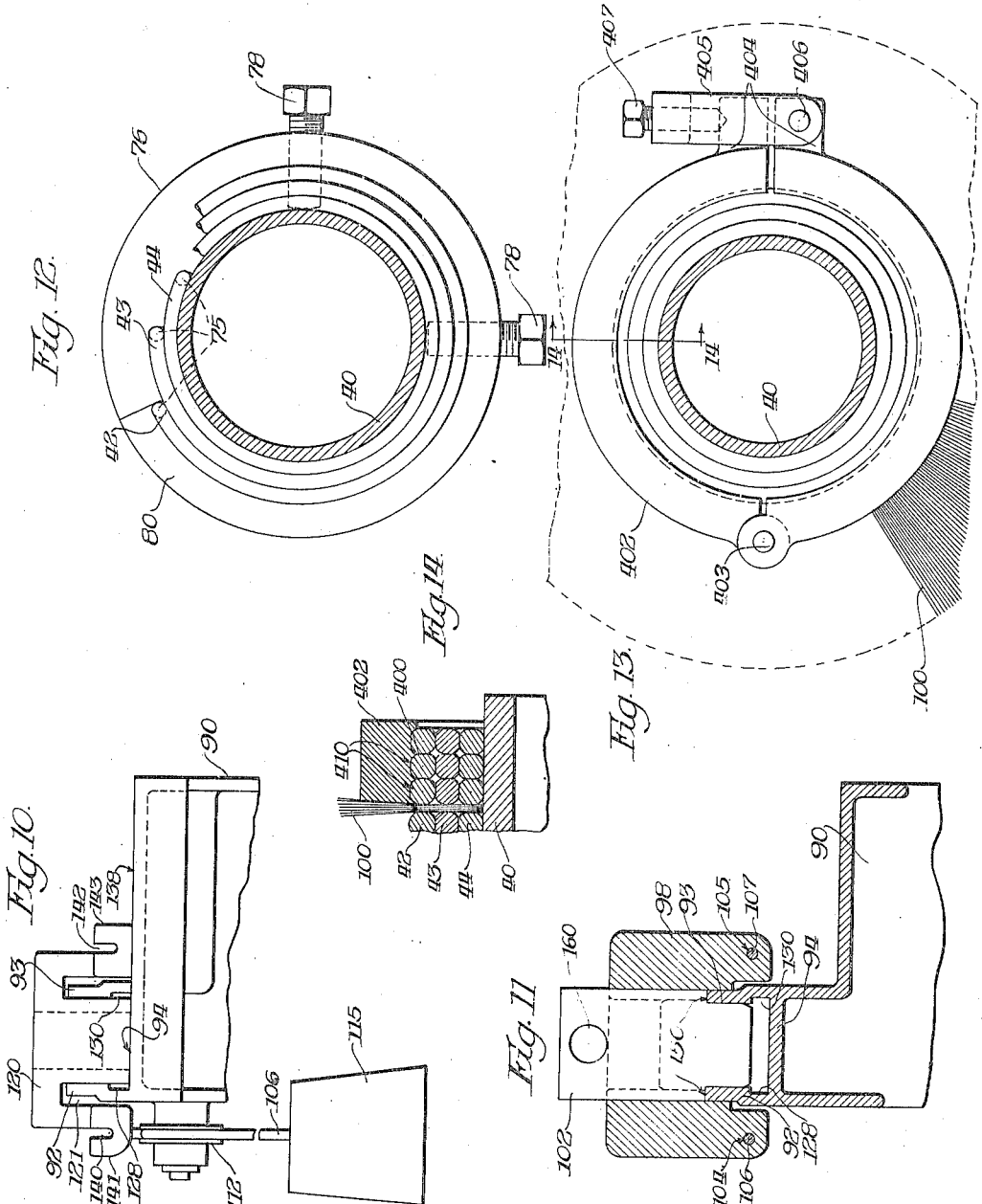

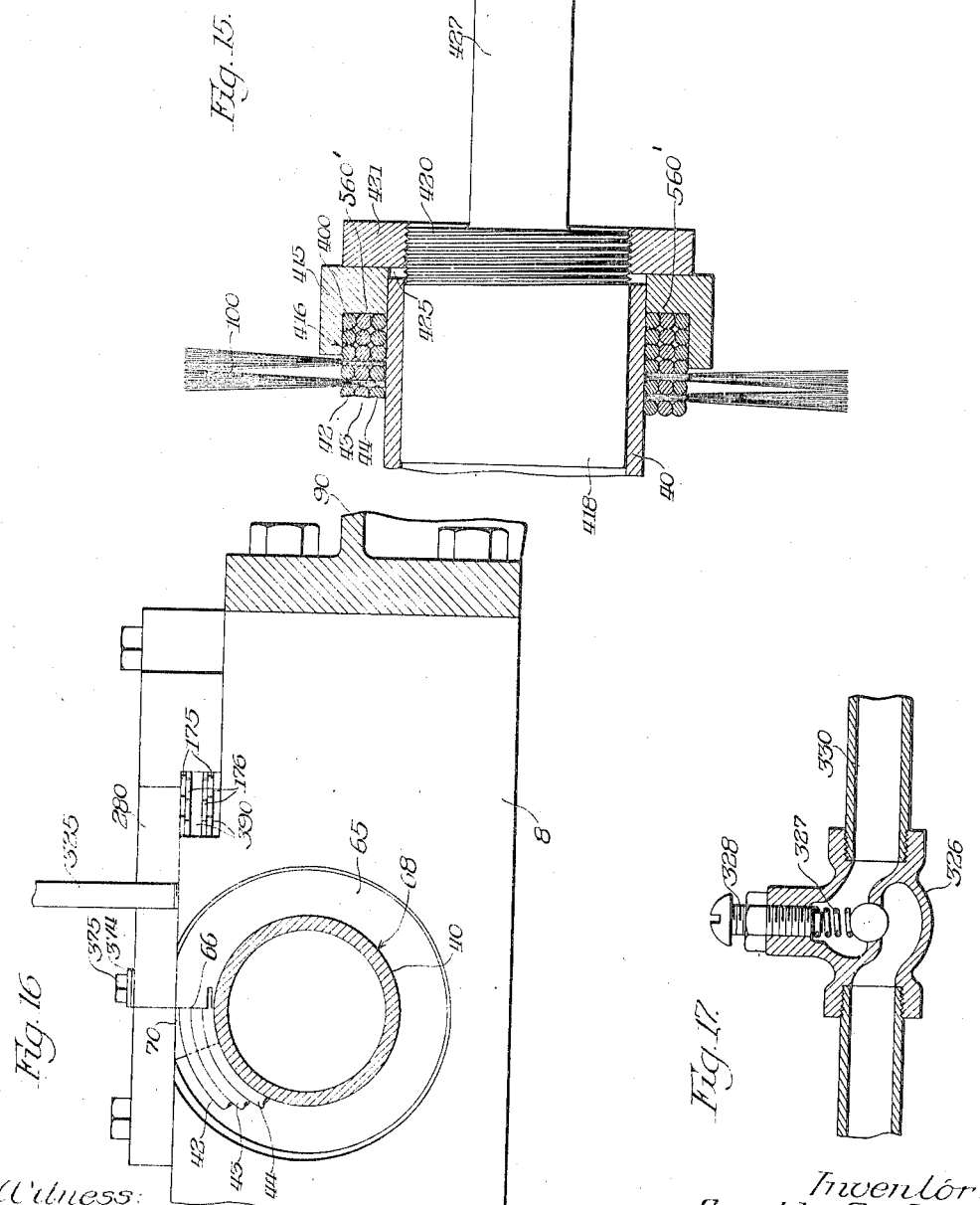

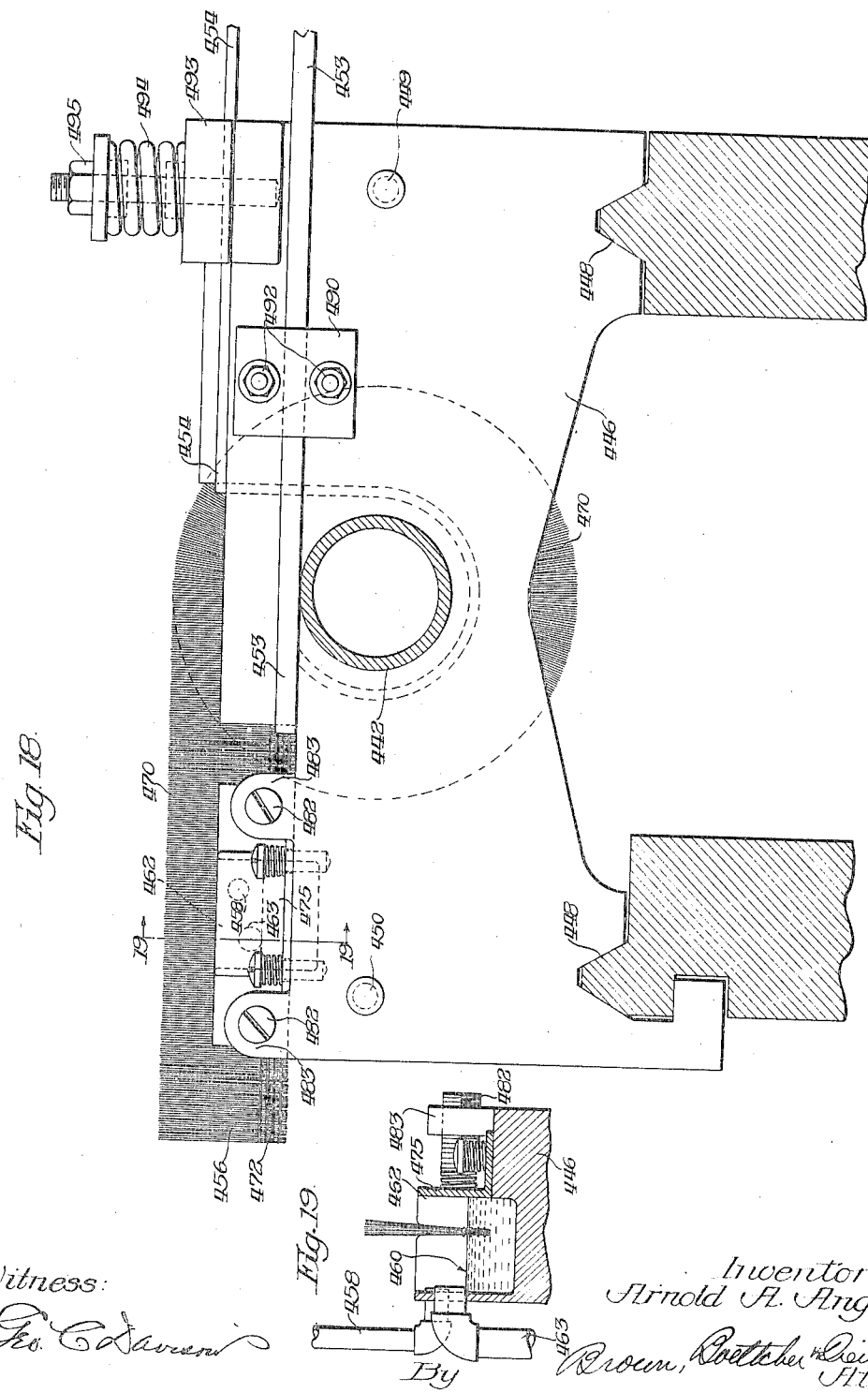

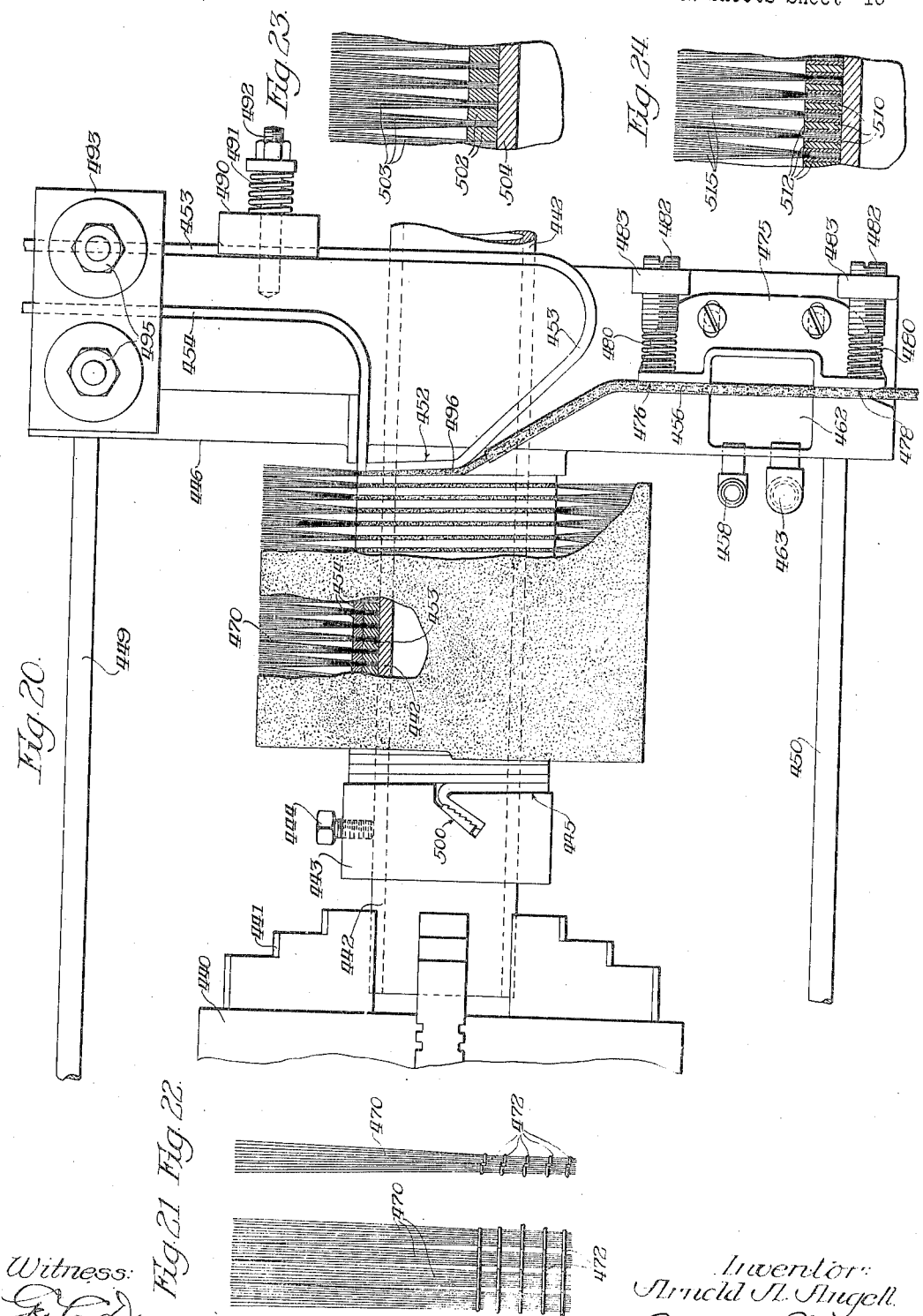

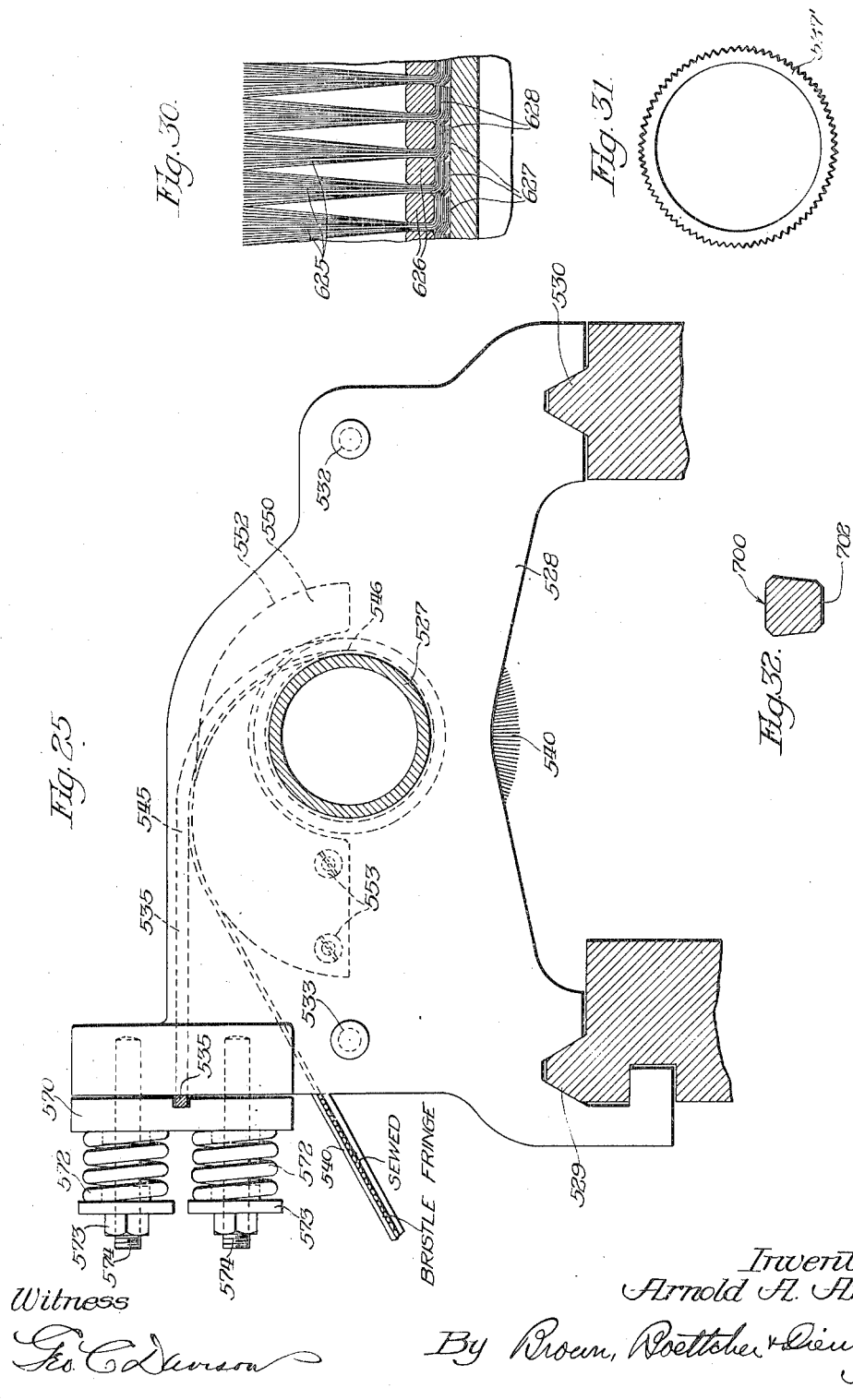

July 16, 1929.  A. A. ANGELL  1,721,062
MEANS FOR MAKING CYLINDRICAL BRUSHES
Filed April 30, 1925   12 Sheets-Sheet 12
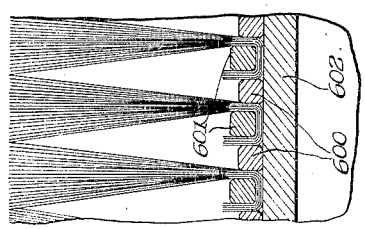
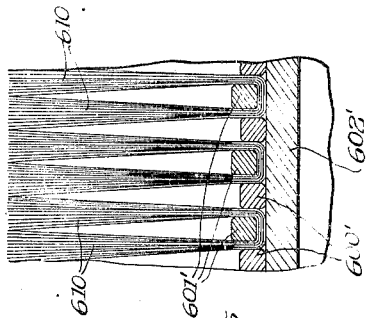
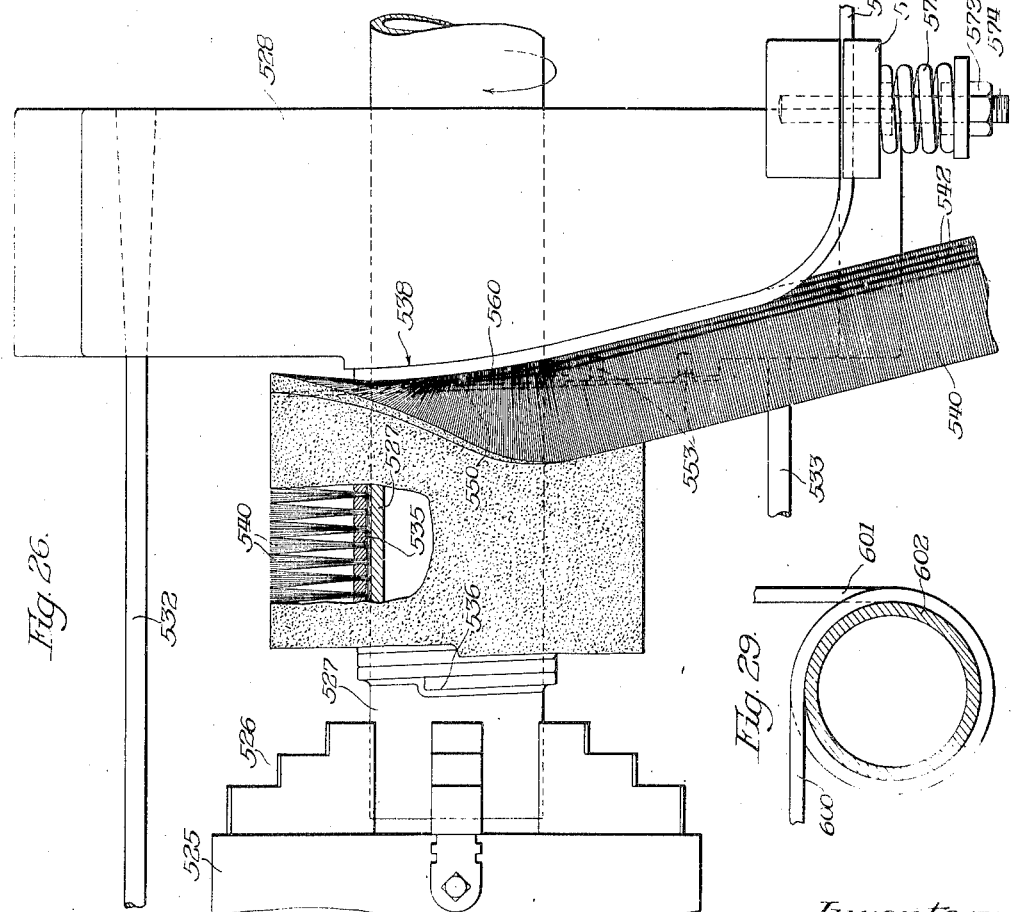

Patented July 16, 1929.

1,721,062

UNITED STATES PATENT OFFICE.

ARNOLD A. ANGELL, OF CHICAGO, ILLINOIS.

MEANS FOR MAKING CYLINDRICAL BRUSHES.

Application filed April 30, 1925. Serial No. 26,870.

This invention relates to cylindrical brushes and more particularly to a means for making same.

The general object of my present invention is to improve the means for making cylindrical brushes.

Another object is to provide for making the brush in a continuous process.

Another object is to provide for using the bristles with their butt ends secured together or unsecured before introduction into the brush.

Another object is to provide for winding the coil into the desired form.

Another object is to provide for feeding the bristles into position between the convolutions of the coil.

Another object is to provide a constant lateral pressure on the turns of the brush as it is made up, to hold the turns firmly together, assure proper winding and permit the use of several strands, one around the other.

Another object is to provide for tensioning and maintaining the desired tension in the coil elements and for adjusting that tension where desired.

Another object is to provide for easy admission of the bristles between the turns of the coil.

Another object is to provide for conveniently varying the quantity of bristles fed in between the successive turns or wrappings of the coil elements.

Another object is to provide for keeping the bristles packed or under suitable pressure at all times.

Another object is to provide for feeding the bristles into place between the turns of the coil without releasing the pressure on the bristles.

Another object is to permit replenishing the bristle supply without interrupting the winding of the brush and without releasing the pressure application on the bristles.

Another object is to provide for applying a suitable binder such as cement or the like.

Another object is to provide means for preventing leakage of the binder and for hugging the strand or coil elements and wiping any surplus of the binding substance therefrom.

Another object is to provide for feeding the binding substance at the desired pressure and means for driving the bristle feeding and binder feeding means.

Another object is to provide for constantly compacting the turns of the coil in the continuous winding process.

Another object is to permit removal of the cord binding the bundle of bristles together after introduction of the bristles where they come in bundles with the butt ends tied together.

Further objects and advantages of the invention reside in the complete correlation of the different elements to cooperate correctly and expeditiously under all circumstances and in the structure, mounting, relative disposition and cooperation of and between the various parts.

The invention is illustrated in the accompanying drawings, in which

Fig. 2 is a plan view of the same;

Fig. 3 is an enlarged end view showing the tubular core of the brush in cross section;

Fig. 4 is an enlarged horizontal section taken on substantially line 4—4 of Fig. 3 along the under offset surface of the plate which covers the channel through which the coil elements pass to the drum or hollow core and the inner ends of the bristle feeding elements, showing these and adjacent parts in plan;

Fig. 5 is a detail section on line 5—5 of Fig. 4;

Fig. 6 is a detail section on line 6—6 of Fig. 4;

Fig. 7 is a detail section on line 7—7 of Fig. 4;

Fig. 8 is a side elevation and partial section of the bristle hopper on line 8—8 of Fig. 2;

Fig. 9 is a longitudinal vertical section through the bristle hopper on the line 9—9 of Fig. 2;

Fig. 10 is a fragmentary outer end view of the bristle hopper;

Fig. 11 is a transverse section on the line 11—11 of Fig. 2;

Fig. 12 is a transverse section on the line 12—12 of Fig. 2;

Fig. 13 is an end view showing the step of temporarily holding the end turns of the brush coil in finishing the end of the brush;

Fig. 14 is a detail section on line 14—14 of Fig. 13;

Fig. 15 is a longitudinal section showing the manner of finishing the end of the completed brush and one way of securing a mounting spindle therein;

Fig. 16 is a transverse section taken on the line 16—16 of Fig. 2 showing the inner face of the main sliding block and the helical surface therein;

Fig. 17 is a detail section on line 17—17 of Fig. 2 through the by-pass valve in the binding substance supply line;

Fig. 18 is an end view similar to Fig. 3 showing an embodiment of the invention in which the bristles are wefted or sewed together into a fringe;

Fig. 19 is a detail section through the cement or binding substance pot taken on the line 19—19 of Fig. 18;

Fig. 20 is a plan view of the embodiment of the invention shown in Fig. 18.

Figures 21 and 22 are side and end views, respectively, of the fringe employed in the embodiment shown in Figures 18 and 20, showing the butt ends thereof sewed together;

Figures 23 and 24 are detail sections showing alternative forms of helical coil or strand elements;

Fig. 25 is an end view similar to Figures 3 and 18 of another embodiment;

Fig. 26 is a plan view of the embodiment shown in Figure 25;

Figures 27 and 28 are detail sections showing a construction in which two wires, cords or strands are wound on the tubular core at the same time;

Fig. 29 is a cross section through the brush core showing how the wires or strands are fed and contact with the tube about 90 degrees apart in making up the embodiments of Figures 27 and 28;

Figure 1:
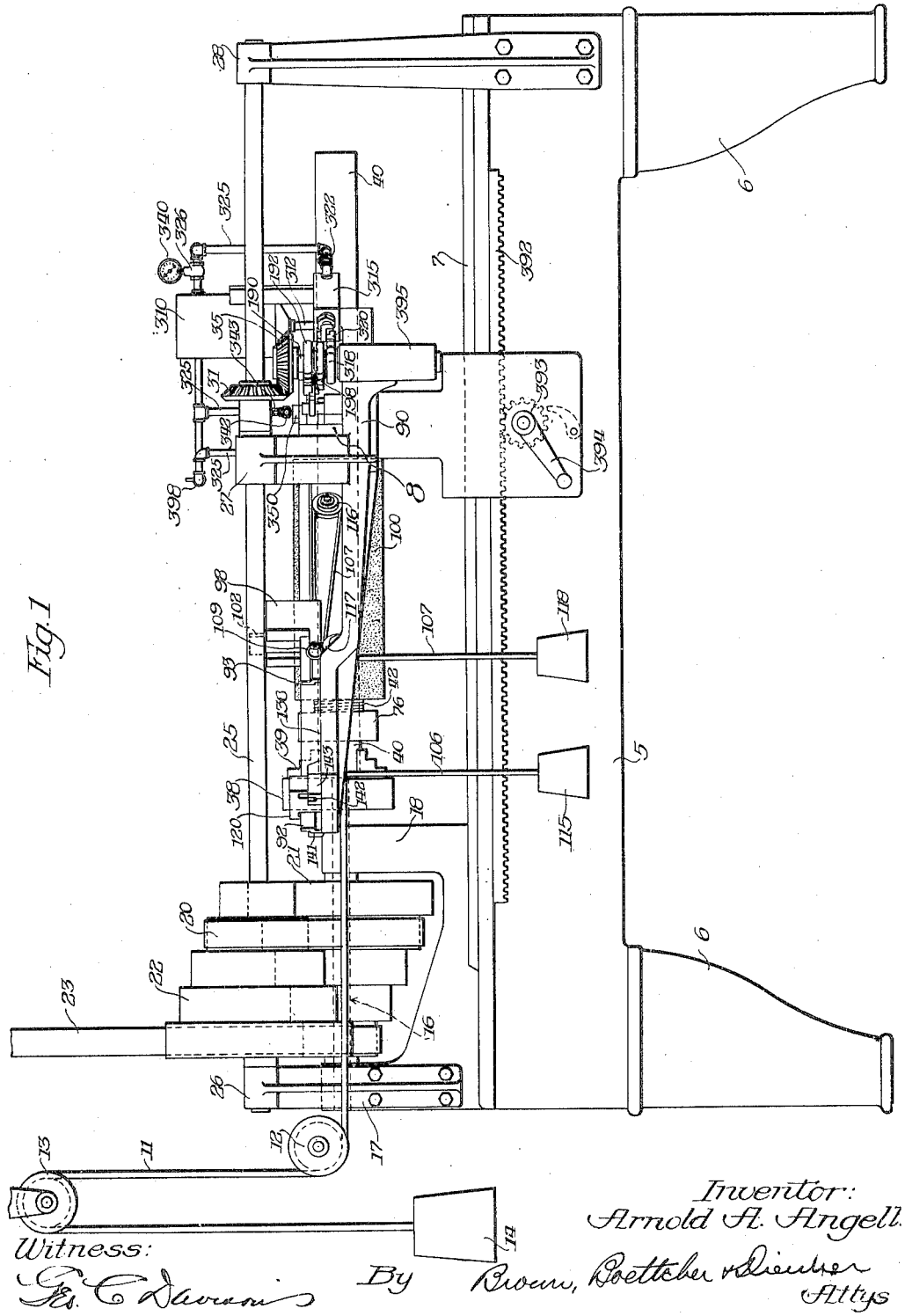
Figure 1 is a front elevational view of an entire machine embodying the invention.

Fig. 30 is a detail section similar to Figures 27 and 28 showing a construction in which the butt ends of the bristles in the fringe are fed under the wire or coil element and protrude and are crushed down to hug the tube by the next wrapping, and Fig. 31 is an end view of a longitudinally corrugated tubular core suitable where coarser bristles are employed and difficulty in feeding them under the wire or coil elements next to a smooth tube is encountered.

Fig. 32 is a transverse sectional view of a tapered form of wire strand used for securing the bristles.

Referring to the drawings the bed of the machine is designated at 5 in Figure 1. The bed 5 may be supported in horizontal position by means of the legs 6 and it has upwardly facing longitudinal tracks 7.

Supported upon the bed 5 for longitudinal sliding movement therealong is a block or carriage 8 having ways 9 in which the tracks 7 engage and guide the block 8 in its sliding movement on the bed 5. The tracks 7 and cooperating ways 9 may be tapered, the block 8 preferably bearing on the tapered sides of the tracks and there being preferably a slight clearance between the opposing horizontal surfaces of the bed 5 and block 8. The block 8 is urged to the left in Figures 1 and 2 by a pair of flexible elements 10 and 11 such as cables, or the like, each having one end anchored to the block 8 as at diametrically opposite points in a horizontal plane as shown. The cables 10 and 11 pass over pulleys or sheaves 12 and 13 and have at their opposite ends weights 14 which tension the cables 10 and 11 and tend to pull the block 8 to the left as viewed in Figures 1 and 2.

The driving spindle 16 may be journaled in the bearings 17 and 18 (Figure 1), and it may be driven by a belt 23 and stepped pulley 21, the belt 20 being trained over a second reversely stepped pulley 22 and driving the same from the pulley 21. The pulley 22 is fixed upon and drives a shaft 25 which shaft 25 drives the bristle feeding mechanism and also the pump for supplying the cement, glue or other binding substance used. The shaft 25 is journaled in a bearing 26 on the bed of the machine and in a bearing 27 which may be carried by the block 8. At its opposite end the shaft 25 is journaled in a bearing 28 on the bed 5. A gear 31 is mounted upon the shaft 25 and is keyed for rotation therewith as by means of a longitudinal groove 30 in the shaft 25, this groove 30 permitting axial movement of the gear 31 along the shaft with the block 8 and bearing 27 and maintaining the gear keyed for rotation with the shaft throughout all its positions. The gear 31 has constant driving engagement with the gear 35, these gears moving as a unit with the block 8 and the bristle hopper and the bristle, cord and binder feeding mechanism carried by said block 8.

The driving spindle 16 has a chuck 38 provided with jaws 39 in which one end of the tube 40 is clamped. The tube 40 forms the core of the brush and in the operation of the machine is rotated from the spindle 16 through the chuck 38 in the direction indicated by the arrow A in Figure 2. The tube 40 passes through and is supported by the block 8 and is free to rotate therein, the block 8 and parts carried thereby sliding longitudinally along the tube 40 away from the chuck 38 as the brush is wound upon the tube. In addition to forming a support for the other parts the block 8 thereby forms a support and guide for the free end of the core forming tube 40.

The strands 42, 43 and 44 which form the helical coil of the brush may be of any suitable flexible material adapted to be wound helically upon the core tube 40 by the rotation thereof and being adapted to space and bind the helical turns of bristles firmly together. Woven cotton fiber cords are preferable although any twisted, braided or woven cord construction may be employed or these strands may be of soft lead or of rubber properly compounded or of any other suitable or preferred material. These strands may be of any desired number and in any combination. In the embodiment illustrated in Figures 1 to 17, three strands are shown, which are wound helically upon the tube 40, one strand outside or around the other. They may be fed to the machine from reels or coils (not shown) and are preferably suitably tensioned in their passage to the the tube 40.

For the purpose of tensioning these strands I provide friction blocks 45, 46 and 47. The blocks 45, 46 and 47 are mounted on studs 48, 49 and 50, respectively, which may be secured at their inner ends in the block 8. The strands 42, 43 and 44 pass from the reels or other source of supply and are turned and pass through grooves 52 in the inner faces of the blocks 45, 46 and 47, these blocks being urged toward the portions of the strands extending through the grooves 52 by springs 53 coiled upon the studs 48, 49 and 50 between the blocks 45, 46 and 47 and suitable washers 54. Nuts 55 are adjustable upon studs 48, 49 and 50 to adjust the tension of springs 53 so that any desired tension may be caused in each of the cords, wires or strands 42, 43 and 44. Additional mounting studs may be provided at the lower ends of the blocks 45, 46 and 47, as shown, if desired.

From the blocks 45, 46 and 47 the strands 42, 43 and 44 extend along the outer end of the block 8, one above the other as shown in Figure 3 to a point just the other side of a vertical plane through the axis of the tube 40. At this point the block 8 is offset downwardly at 60 providing a vertical shoulder 62 rounded from the outer end of the block 8 and the cords or strands 42, 43 and 44 are turned in about this shoulder 62. The shoulder 62 is inclined to a vertical plane through the axis of the tube 40 at 63 to feed the strands 42, 43 and 44 one above the other to a helical surface 65 in the inner surface of the block 8.

The helical surface 65 starts at the point 66 (Figures 2, 4 and 16), and extends helically about the tube receiving bore 68, terminating at point 70. Between the points 70 and 72 the slope of the helix is preferably greater than between the points 72 and 66 where it has a uniform spiral advancement approximately equal to the pitch of the winding of the brush. This increased slope of the helical surface 65 between the points 70 and 72 forms a throat for the more easy admission of the bristles between the strands or cords, the throat being thereby slightly larger at the point of admission of the bristles and decreasing slightly to slightly compact the bristles into position between the convolutions or turns of the helical coil.

The free ends of the strands 42, 43 and 44 are anchored at 75 in a collar 76 fixed as by means of a set screw 78 upon the tube 40 adjacent the chuck 38 to rotate as a unit with the tube 40 when the same is rotated by the spindle 16. The coil end of the collar 76 has a spiral face 80 to receive the anchored end turn of the coil as shown.

At the outset the slidable block 8 and parts associated therewith are positioned with the block 8 adjacent the brush end of the collar 76. Upon starting the machine the tube 40 is rotated by the power of the machine and the strands 42, 43 and 44 being anchored at 75 are drawn in and wound helically upon the tube 40. At the same time the bristles are fed between the convolutions of the coil and the gradual continuous building up of the brush ahead of the block 8, forces said block away from the collar 76 longitudinally of the tube against the tension produced by the weights 14. The weights 14 impose through the block 8 a continual uniform axial pressure upon the brush to press the turns of the coil and bristles firmly together. The tensioning means for the block 8 thereby exerts, through the block 8, a constant axial compacting pressure on the brush as it is built up and the movement of the block maintains the parts associated therewith operatively positioned with respect to the brush at all times. The formation of the helical surface 65 in the block 8 feeds the coil helically onto the drum and provides for the reception of the bristles between the turns of the coil and with the other parts and the correlation therebetween assures a nice uniformity in the layer or turns of bristles fed between the turns of the coil.

For the purpose of guiding the spread portions of the strands 42, 43 and 44 adjacent the tension blocks 45, 46 and 47 a plate or block 85 may be secured to the block 8 and with its outer edge or face flush with the outer end of the block 8.

Fastened to and carried by the block 8 is a frame 90. The bristle supply hopper or trough is formed in frame 90 between a pair of side walls 92 and 93. The horizontal shelflike portion 94 of the frame 90 forms the bottom of the bristle hopper and the frame may be provided with suitable bolting flanges for attachment to the block 8 and with suitable strengthening ribs as desired. The forward end of the bristle hopper opens at 95 to the means which feeds the bristles between the turns of the coil in the winding of the brush. Slidably mounted at its opposite sides on the side walls 92 and 93 is a block 98, the central portion of which is arched at 99 over the bristles 100 in the hopper. Slidably mounted in vertical guides in the block 98 is a plate or gate 102. The plate or gate 102 is guided in the block 98 so that it may be raised or lowered and its lower end is preferably narrower to fit closely to the side walls 92 and 93 of the hopper.

Holes are provided at 104 and 105 in the block 98 through which cords or other suitable flexible elements 106 and 107 pass. The cords 106 and 107 have rings 108 and 109 or other suitable stops that may be conveniently grasped at their ends which engage against the block 98 and cause it to hug to the right (Figures 2, 8 and 9), due to the tension in the cords 106 and 107. The cord 106 passes or is trained over the pulleys 110 and 112 and may be tensioned as by means of a weight 115 at its free end. The cord 107 passes over pulleys or sheaves 116 and 117 and may be tensioned by a weight 118.

Outwardly of the block 98 is a second block 120 slidably mounted upon the frame 90 and guided at 121 by the longer outer side wall of the bristle hopper. The block 120 is machined to fit closely between the side walls 92 and 93 and at the forward end of the block 120 is a projection 125 spaced above the bottom 94 of the bristle hopper and provided with a curved forward edge 126. The side walls 92 and 93 are grooved longitudinally throughout their lengths as indicated at 128 and 130, in Figures 10 and 11.

While the bristles may be sewed or otherwise secured together into a continuous fringe or strip, for use in connection with my present invention, as will be hereinafter more fully pointed out, the embodiment of the invention which I am now describing is particularly adapted for laying or feeding unsecured bristles between the turns of the coil.

The bristles are generally supplied to the brush manufacturers tied up in bundles with the butt ends all one way and with the string or other binding means wrapped close to the butt ends. To supply the bristle hopper with bristles such a bundle may be placed upon the shelf 94 against the curved forward edge 126 of the projection 125 and with the butt ends down. The side wall of the feed hopper may be discontinued at 135 (Figure 2), and the bottom 94 of the feed hopper may be widened out beyond the end of the side wall 93 to form a deck 138 over which the bundles of bristles may be slid into position ahead of the curved edge 126. The block 120 is then pushed inwardly toward the block 98 to confine the bundle of bristles between the curved edge 126 and the slide or gate 102.

The flat table 138 provides a surface upon which the butt ends of the bundle of bristles may be engaged to even up the ends of the bristles and cause the butt ends of all of the bristles to terminate in one plane and in this condition and without lifting they may be slid upon the surface 138 into position ahead of the extension 125.

The ring 108 is then drawn back and the cord 106 placed in a slot 140 in the block 120. The ring engages the end of the slotted lug 141 and thereby transfers the pull of the cord 106 from the block 98 to the block 120 compacting the bristles firmly between the projection 125 and the gate 102. It is to be noted that in this way the bristles between the projection 125 and gate 102 are packed without releasing the packing of the bristles ahead of the gate 102. The bristles ahead of the gate 102 are at all times properly packed by either one or both of the weights 115 and 118 and by avoiding releasing the pressure upon the bristles it is unnecessary to stop the machine every time it is desired to replenish the bristle hopper. The process is continuous and that process is not in any way interrupted by feeding the bristles to the hopper.

The ring 109 is then drawn back and the cord 107 placed in a slot 142 in a lug 143 on the block 120. So that the pull of the cord 107 is also transferred from the block 98 to the block 120, the cord 106 with its associated weight acting through the bundle of bristles between the edge 126 and the gate 102 to maintain the proper pressure upon the bristles ahead of the gate 102 during this time. The bottom edge of the slide or gate 102 can not go below the top of grooves 128 and 130 because of the engagement of the shoulders 150 of the gate with the upper edges of the side walls 92 and 93. The block 120 is preferably recessed at 152 and the inner end 153 may be inclined as shown. The cord 155 (Figure 9), about the confined bundle of bristles being free of the gate 102 and also free of the block 120 and of the side walls 92 and 93 because of the longitudinal grooves 128 and 130 may now be cut.

The space below the slide 102 and the curved projection 125 in conjunction with the grooves 128 and 130 prevents contact on the binding cord 155 of the bristles so that when said cord is cut it may be freely withdrawn through the opening 152 of the block 120. The slide or gate 102 which may be provided with a lifting aperture 160 is now raised or lifted free of the confined bristles, removing any separation between the bundle 162 and the bristles 100 and maintaining the uniform packing pressure of the entire group of bristles through the projection 125. The block 98 is then moved outwardly to the left (Figures 2, 8 and 9), until the slide or gate 102 is to the rear of what was the bundle of bristles 162 before cutting the string 155 tying them together. The slide 102 is then lowered to rest at its lower edge on the forward projection 125 of the block 120 just to the rear of the curved edge 126. The ring 108 is now raised to withdraw the cord 106 from the slot 140 and is again allowed to engage the block 98 as shown in Figures 2, 8 and 9. The ring 109 is also raised from the slot 142 and allowed to engage against the block 98 so that the pull or tension in both cords 106 and 107 is again transferred back to the block 98.

The bundle of bristles liberated from the string tying them together are now ahead of the slide 102 and are a part of the bristles 100 in the feed hopper packed forwardly toward the bristle feeding mechanism through the gate 102. As the pull of the cords 106 and 107 is transferred from one block to the other, one after the other and not both at once, the effect of the pull of at least one cord is always present on the bristles in the feed hopper. The feed hopper is thus kept supplied with bristles while the machine is in operation, allowing the winding of the brush to go on uninterruptedly from start to finish as already pointed out. The pulleys or sheaves 110, 112, 116 and 117 may be journaled upon the frame 90 as shown or in any other suitable or desired manner.

The bristle feeding mechanism is operatively disposed at the outlet 95 of the bristle hopper and comprises two pairs of feed blades or members 175, 175 and 176, 176 (Figures 4 and 5). Each of the blades has a serrated edge 178 forming four rows of teeth at the outlet of the bristle hopper. The outer pair of toothed blade members 175 are attached to and form a part of a feed foot bar 180. The inner pair of toothed blade members 176 are attached to and form a part of a feed foot bar 185. The blades 175 may be attached to the bar 180 by securing elements 186 and the blade members 176 may be attached to the bar 185 by means of securing elements 188.

As already pointed out, the shaft 25 is caused to rotate from the same source of power which rotates the tube 40. The bevel pinion 31 is free to slide along the shaft 25 and is caused to rotate with it by a key fitted into the slot 30. Bevel pinion 31 meshes with bevel pinion 35 fixed upon the vertical shaft 190 to rotate it therewith.

The vertical shaft 190 has upon it an eccentric 192 with its center at 193. This eccentric may be in the form of the usual strap eccentric and is connected through a link to the feed foot bar 185 at 195. The shaft 190 also has an eccentric 198 with its center at 199 which may be of the form similar to the eccentric 192 and is connected through a suitable link to the feed foot bar 180 at 200.

For the purpose of causing teeth or serrated edges of the blades 175 and 176 to yieldably hug the angular surface 205 which extends from the hopper outlet to the helical surface 65, I provide a leaf spring 210. This spring may be anchored at one end in a relatively stationary block or support 212 and its opposite free end is turned laterally and tapered to engage in a tapered recess 214 centrally in one edge of a block 215. The block 215 carries a pair of rollers 216 and 217 which may be rotatably mounted upon suitable spindles secured in the block 215 as by means of set screws 220. Roller 217 contacts at 222 with the feed foot bar 180 and roller 216 contacts at 223 with feed foot bar 185. Rollers 225 and 226 contact with the edges of plates 227 which are a part of the feed foot bar 180 and a larger roller 230 journaled with the roller 226 contacts with the feed foot bar 185. A guide 250 (Figure 2), bolted or otherwise secured to the frame 90 may be provided for guiding the pressure feed feet or bars 180 and 185 in their horizontal shifting movement.

In the operation of the machine, rotation of the vertical shaft 190 causes a shuttle-like movement or action of the feed feet bars 180 and 185 and the same action of the toothed feed members 175, 175 and 176, 176, attached thereto respectively. The eccentrics 192 and 198 on vertical shaft 190, have their centers 180 degrees apart about the center of vertical shaft 190 and the same distance from this center so that rotation of shaft 190 causes the toothed feed members 175, 175 to always be traveling in the opposite direction to toothed feed members 176, 176, the length of the stroke of each being preferably a little in excess of pitch of the feed teeth. The forward travel of feed teeth 175, 175 engages the bristles entrained ahead of each tooth forcing them toward the outlet 95 of the bristle trough or hopper, ahead and into the throat 252 between the portion of the cords or coil elements just leaving the helical surface 65 and that portion of the cords or coil elements just entering upon the helical surface. At the same time feed teeth 175, 175 are travelling forward feed teeth 176, 176 are travelling rearward and are caused to become disengaged in their rearward travel from the entrained bristles due to the sloping rear face of each tooth causing them to be wedged or cammed outwardly from the compact bristles being pushed ahead by feed teeth 175, 175. As the feed teeth blades 176, 176 are thus disengaged the block 215 is free to be rotated slightly in a clock-wise direction about the knife edge engagement of the spring 210 therewith simultaneously deflecting spring 210 slightly. As the rearward travel of the feed teeth blades 176, 176 is preferably slightly in excess of the pitch of the vertical faces of the teeth, they are free to rise up due to the action of spring 210, just before they have completed their rearward travel and thus again come into position to engage the entrained bristles upon the start of the forward stroke. The amount of their travel in excess of the distance between the vertical faces of the feed teeth, gives the desired clearance to permit them to freely rise into position before advancement. The cycle of operation of each set of feed teeth is the same, one following the other 180 degrees of rotation. The entrained bristles ahead of each pair of feed teeth are thus pushed or forced ahead with each forward stroke of each set of teeth and are pressed or packed into the throat 252.

This action thus causes a crowding ahead of the entrained bristles and a secure packing of them between the turns of the cords or other coil element or elements as they enter unto the helical surface 65 of the block 8 and are wound helically upon the core tube 40. Due to the increased slope of the helical surface between the points 70 and 72, the throat 252 widens slightly toward its inlet for the more easy admission of the bristles between the cords.

The bristles are thus fed uniformly between the turns of the coil elements without, at any time, releasing the compacting pressure upon the bristles and without, in any way, interfering with the continuity of the wrapping of the turns of the brush elements onto the tube 40. The quantity of bristles fed in between the successive wrappings of the cords may be determined by the shape of the throat 252 and by the speed at which the shaft 190 is caused to rotate with respect to the speed of rotation of the tube 40. The quantity of bristles fed between the turns of the coil determines the density of the finished brush. The relation of the speed of the feed mechanism to the speed of rotation of the tube 40 may be readily adjusted as by shifting the belt 20 on the stepped change speed pulleys or where a different drive is employed in any other suitable manner. The tension produced in the cables 10 and 11 by means of the weights 14 causes the block 8 to exert a constant axial pressure toward the drive end of the machine to allow for winding the several strands of cord one above the other at the same time, where several strands are employed, and to firmly anchor the butt ends of the bristles between the turns of the coil.

It might be said here that while I have described a system of weights for moving the block axially to maintain this axial pressure and to maintain the parts properly positioned with respect to the particular portion of the brush being formed and for compacting the bristles in the hopper any other suitable tensioning means may be employed. Axial pressure insures a suitable anchorage of the bristles and by providing for adjusting the same any desired compression may be imposed.

The lower part of the outlet from the bristle hopper may be defined by block portion 275 which may be integral with or suitably secured upon the block 8. The block portion 275 has an edge 276 (Fig. 4) extending obliquely or sloping from the outlet of the bristle hopper to the feed teeth, this edge defining the bottom of the outlet. The top of the block 8 and the cord channel thereto is covered by a cover plate 280 offset at 282 (Figure 3), this cover plate overlying the blocklike portion 275 (Figure 2) and the feed ends of the feed bars, block 215 and associated parts. The posts for the rollers 225 and 226 may be secured in the frame 90 by set screws 300 as shown in Figure 8, and in Figure 9, is shown one manner of mounting the rollers 216 in the block 215.

For the purpose of securely binding the wrappings of bristles and coil turns of the brush together I provide for applying a binding substance to the coil strands and to the butt ends of the bristles as they are fed to the tube 40. The binder may be a liquid cement of suitable consistency and composition or any other suitable or preferred substance. The binder may be a suitable rubber composition and the entire brush after winding may be placed in an oven at vulcanizing temperature and vulcanized or the cement may be of any of the many air drying cements, being waterproof or not as the service of the brush may require.

The binding substance may be carried in a tank or reservoir 310, suitably mounted upon the frame 90, as shown in Figures 2 and 3. From the tank 310 the binder may be supplied through an outlet pipe 312 and check valve 314 to a piston pump 315 or any other desired style of pump. The piston 316 of the pump 315 may be actuated synchronously with the rotation of the tube 40 and the drive of the bristle feeding mechanism by means of an eccentric 318 mounted upon and driven by the shaft 190 and drivingly connected with the piston 316 as through a link connection 320.

The cement or other binder discharged by the pump 315 passes a check valve 322 in the outlet from the pump and enters a pipe line 325. Constant pressure may be maintained in the binder supply system by a relief valve 326, the spring 327 of which (Figure 17) may be adjusted as by means of the screw 328, the surplus cement pumped, over that required being allowed to by-pass valve 326 and flow through pipe 330 back into the supply tank 310. A suitable pressure gauge 340 may be placed in the pipe line 325, as shown in Figure 2.

The pipe line 325 has an outlet at 342 the flow from which may be controlled by a valve 343.

The block 8 has an opening 346 (Figures 4 and 7), which opening intersects the path of the strands 42, 43 and 44 through the block 8 and extends beneath the lowermost strand, as shown in Figure 7. The cover plate 280 has an opening 348 (Figure 7), which registers with the opening 346 vertically and secured in the opening 348 is a relatively short stand-pipe 350 into which the outlet 342 discharges. Cement or binding substance supplied through the pipe 325 is allowed to run from outlet 342 when the valve 343 is open into the stand-pipe 350 through which it flows into openings 348 and 346 and completely surrounds the cords or strands 42, 43 and 44 in their passage to the drum. The strands 42, 43 and 44 are thereby thoroughly coated with cement in their pasage to the drum 40.

The end of the pipe-line 325 is connected at 260 (Figures 2, 4 and 5), into an opening 362 in block 8 (Figure 5). From the opening 362 the cement or binder is supplied under the pressure in the system to slots 363 and 364 which slots open out through the edge of the raised portion of the block 8 in which the opening 362 is formed to the entrained bristles being fed to the point of winding, as shown in Figure 5. The outlet slots 363 and 364 are preferably at the heights as shown so they will not come opposite to the feed teeth blades 175, 175 and 176, 176. The shelf-like portions 390 (Fig. 5) of arm 380 which extend between and under the feed teeth blades are recessed at their outer edge as at 650 (Fig. 4) forming pockets 652 and 653 opposite the slots 363 and 364 (Fig. 5) respectively. Due to the pressure of the cement in the slots 363 and 364 it is forced through the entrained bristles keeping the pockets 652 and 653 constantly filled. The cement is thus caused to penetrate into and through the base of the bristles and thoroughly impregnate the butt ends of the bristles in their passage to the throat 252. The open end of slot 363 next to the bristles in the feed hopper or trough permits a certain penetration and saturation with cement of the butt ends of the bristles before they become engaged with the feed teeth, thus giving additional assurance that the cement will reach all bristles. It should be noted that the continuity of the process is in no way interfered with by the application of the cement or binder to the bristles and strands of the brush.

The cement or binder may be prevented from running out or leaking at the point of entrance of the cords by means of a felt or other suitable corner plug 370, as shown in Figures 4 and 5. For wiping and preventing leakage along the tops of the strands the cover plate 280 is provided with an opening 372 in register with the path of the strands or cords. A cylindrical felt or other suitable plug 373 is mounted in this opening 372 and pressed down against the top cord or strand 42 by means of a leaf spring 374 anchored at its opposite end by bolts 375 on the cover plate 280. The escape of cement is thus prevented at this point and all cords thus pass through a pool of cement which is kept constantly supplied by the flow through the control valve 343.

For the purpose of preventing excessive application of the cement to the cords and wiping the sides of the same which are away from the block 8 I provide an arm 380 pivoted at 382 (Figure 4). The inner end of this arm is tapered to provide a head which lies between the bristles 100 and strands 42, 43 and 44 in their passage to the drum and to provide a point 384 which is caused to hug the strands 42, 43 and 44 and wipe any surplus cement therefrom and to prevent undue leakage of the cement out to the throat 252. The opposite end of the arm 380 extends out from the block 8 at 386 (Figure 2), and a spring 387 connected between this extending end and relatively stationary anchor 388 urges the pointed tip 384 yieldingly into engagement with the strands 42, 43 and 44. The arm 380 has shelf-like portions 390 (Figures 5 and 6), one of which extends between the serrated members 176 and the other of which underlies the lower serrated member 175 so as to firmly support and brace the outer ends of these members. The arm 380 thereby in addition to wiping the cords and preventing excessive leakage of cement braces and supports the outer ends of the bristle feeding elements and forms a continuity of the throat 252 to form an entrance to said throat and to close up the gap that would otherwise exist between the ends of the feed teeth bars 175, 175 and 176, 176 and the strands 42, 43 and 44 at their point of entering 66 upon the helical surface 65.

For the purpose of moving the block 8 and associated parts manually along the machine the bed 5 may be provided with a rack 392 (Figure 1), and the carriage with a cooperating pinion 393 which pinion may be turned by a crank arm 394. The vertical shaft 190 may be journaled at its lower end, that is, below the eccentrics in suitable bearings in a bracket 395 on the block or carriage. The cement supply to the bristles may be controlled by a valve 398.

The operation may be summarized briefly as follows:

With the machine at rest the tube 40 which is to form the core of the brush is mounted in the chuck 39 and the collar 76 is secured upon the tube adjacent the chuck 39. Extending the tube 40 through the opening 68 in the block 8 the block and entire carriage is moved longitudinally along the tube on the bed 5 of the machine to close proximity to the collar 76. The strands 42, 43 and 44 which are to make up the coil elements of the brush are then led in from the reels or other source of supply under the tension blocks 45, 46 and 47 and through the path previously pointed out to the helical surface 65 and then to the collar 76 in which the ends of the strands are anchored at 75.

The bristle hopper and cement reservoir having been properly supplied and the belt 20 or other change speed provision having been properly set to provide the desired relative speeds beeween the tube 40 and bristle feeding mechanism, the machine is started. The rotation of the tube 40 draws the strands 42, 43 and 44 onto the drum wrapping them helically thereon and the helical surface 65 causes a crowding of the turns of the helix laterally or longitudinally of the tube toward the chuck end so that the successive windings of the brush will hug one another and a firm compact wrapping will be secured.

The bristles in the bristle hopper are urged by the tension means toward the feed members and the feed members are driven synchronously with the core tube and feed the bristles from the bristle hopper to the throat 252 and thence to the spiral surface of the block and between the successive turns of the strands or cords 42, 43 and 44. The pump 315 being driven synchronously with the bristle feeding mechanism and with the rotation of the tube 40 supplies the cement or other binding substance to the opening or pocket 346 and grooves 363 and 364 from where the cement is thoroughly applied to the cords or strands 42, 43 and 44 in their passage to the tube 40 and to the butt ends of the bristles 100 in their passage into position between the successive turns of the coil. The weights 14 by exerting a tension on the cables or flexible elements 10 and 11 exert a constant pressure laterally upon the turns or windings of the brush laterally thereof or longitudinally along the tube 40 in the direction of the chuck end thereof. This permits the wrapping of several strands one about the other as shown and maintains a constant lateral pressure on the turns of the brush to hold them together firmly and securely in the process of making and to such an extent as to form a bonding and anchorage of the bristles independent of the cement used.

The bristle supply may be replenished as already pointed out as often as desired in the process of making one brush, for example, without interfering with the continuity of formation of the brush and without releasing or in any way varying the supply of bristles through the feeding mechanism. The cement supply to the strands may be at any time controlled by the valve 343. The supply to the bristles may be controlled by varying the pressure in the system by means of the adjusting screw 328 (Fig. 17) in valve 326, surplus cement pumped thus being by-passed through valve 326 back to the supply tank. Leakage of the cement from the block 8 or pockets from where it is applied to the bristles and strands is effectively prevented as already pointed out and the pressure of the cement causes it to penetrate into the bases of the bristles and to thoroughly impregnate them. Proper and complete application of the cement to the strands 42, 43 and 44 is accomplished by their passage through it as set forth.

As the brush is built up to the desired length the block 8 and entire carriage moves outwardly axially along the tube 40 away from the chuck end thereof. When the desired length of brush is attained the end may be finished by wrapping several turns of the coil strands without bristles between them as shown at 400 in Figures 14 and 15.

A split clamp 402 (Figures 13 and 14), is then clamped upon the end turns 400, before removing the pressure of block 8 and the tension in strands 42, 43 and 44, to bind the successive turns of the brush in place until the cement has firmly set and until the final finishing collar is put on. The clamp 402 may comprise a pair of semi-circular sections pivoted together at 403 and having lateral or radial lugs 404 at their free ends through which the two halves of the clamp are clamped or bound together firmly upon the turns 400 as by means of a latch or clamp 405 pivoted to one of the lugs 404 at 406 and adapted to be swung about the other with a set screw 407 provided for drawing the two halves of the clamp together. The inner periphery of the clamp 402 may be grooved spirally at 410 to properly accommodate the curved formation of the turns 400 as shown in Figure 14.

When the cement has set and it is desired to finish the end of the brush, the split clamp 402 is removed and a permanent collar 415 (Figure 15), is placed upon the ends of the tube 40 and over the end turns 400. The collar 415 is recessed at 416 to receive the end turns 400, the face 560' being helical to give even bearing against the strands throughout the circumference.

Where a mounting spindle is desired, one such as shown in Figure 15 may be provided. The enlarged inner end 418 of this spindle may be pressed or otherwise secured in the end of the tube 40. The outer end of the enlarged plug portion 418 of the spindle is shown as being threaded at 420 and a nut 421 is screwed upon the threaded end 420 up into engagement with the collar 415 firmly clamping the collar 15 against the turns 400 longitudinally toward the opposite end of the brush. The turns 400 and the length of the tube 40 and collar 415 are preferably proportioned to provide a clearance 425 between the nut 421 and the end of the tube 40 so that the collar 415 will be brought up firmly against the turns 400 before the nut comes into engagement with the adjacent end of the tube 40. The reduced end 427 may form the mounting spindle at this end of the brush and the end of this reduced spindle may be further reduced at 428.

The threading of the head 418 of the spindle also permits threading a section of tubing which may be of the same external diameter as the core tube 40 onto the head of the spindle and up into abutting end to end engagement with the core tube 40. The length of the core over that of the finished brush may be temporarily increased in this manner to permit winding as many additional end turns 400 as desired and after the brush is set as many of these turns may be removed as desired, to leave the desired number of finishing end turns for the finished brush.

The opposite or chuck end of the brush may be similarly finished by wrapping a few turns of the coil element without bristles between them and mounting a spindle in that end with a collar and nut similar to that described in connection with Figure 15.

In the embodiment shown in Figures 18, 19, 20, 21 and 22 the chuck 440 has jaws 441 in which the tube 442 forming the core of the brush is clamped to be rotated under power in the maner previously described, or in any other suitable manner. Collar 443 is locked upon the tube 442 by means of a set screw 444 and has a spiral face 445. The block 446 is free to slide along guides 448 and is drawn to the left (Fig. 20), due to the tension in the cables 449 and 450, which pass over pulleys and have weights attached to their ends as before. The tube 442 is free to rotate in the block 446. The block 446 is provided with a spiral face 452, having such shape as to evenly bear on the strands or turns as they are wound.

The strands 453 may be of rubber, which may be of such consistency as to best suit the nature of the bristles being used, or it may have as a part of its structure a canvas center or sides, or cords may be moulded into it to give it any desired strength and to resist any tendency to stretch or to be elongated under pressure or it may be of woven or twisted cotton cord or of other suitable material. The rubber may be of such compounding as to permit of vulcanizing under suitable temperatures after completion of the winding. The strand 454 may be of metal, which may be steel, bronze, lead, or any other metal or material found to be best suited to the purpose for which the brush is to be used. The strip 456 is the fringe of bristles. The bases of the bristles 470, making up the strip 456, may have been previously sewed or wefted together, as shown at 472, in any suitable or desired manner. Suffice it here to say that the bristles 470 are sewed together at 472 into a continuous fringe or bristle strip, which is preferably of uniform thickness or density.

Cement or any other suitable binding substance, preferably of proper composition for vulcanizing under suitable temperatures, or for air drying is fed through a pipe 458 to maintain a desired level, as indicated at 460 in Fig. 19, in the cement pot or reservoir 462 on the block 446 is an overflow or outlet opening into an overflow or outlet pipe 463 from this reservoir operating in conjunction with the inlet to maintain the desired level 460. The pipe 463 may conduct the surplus cement back to a suitable pump, not shown, from where it may again be supplied to the pipe 458 and thence back to the reservoir. The pocket or pot 462 preferably carries down under the base end of the fringe of bristles, so that the lower edge of the fringe is entirely submerged in the pool of cement, as it passes through it to the drum or core tube 442.

A shoe 475 is caused to hug the fringe of bristles at 476 and 478 and thereby give any desired tension to the fringe, by means of springs 480, the tension of which may be adjusted and thereby the tension on the fringe also adjusted by means of screws 482 threaded through lugs 483 on the block 446. The compression of shoe 475 at 476 will cause the cement to penetrate into the bases of the bristles to thoroughly impregnate the same, and will also cause the surplus cement to be wiped off.

The desired tension is given to the strand 453 by means of a block 490 held against the strand 453 by springs 491, the tension of which may be adjusted by nuts 492. The desired tension may be given to the strand 454 by means of a pressure block 493 held against the strand 454 by springs 494, the tension of which may be adjusted by nuts 495.

The surface 452 on the block 446 preferably has such a slope at the entrance of the strands onto it as to form a wedge-shaped throat 496, which causes a gradual application of the lateral pressure of the strand 453 against the bristles 470, thereby overcoming any tendency for the bristles to be crowded out at this point of entrance. This crowding out tendency is overcome in the previous embodiment in substantially the same manner. The strand 454 is fed into position some distance from the point where strand 453 and strip 456 make contact with the tube 442, for in this position the strand 453 is under lateral pressure from the surface 452 and can better resist any crowding back effect, due to the tension and resulting pressure of the strand 454. The tension in the strand 454 causes the strand 453 to be thoroughly bedded about the bunches of bristles 470 and resists any tendency of the strand 453 to be flattened out, due to the lateral pressure of the surface 452. The butt ends of the bristles 470 are then bedded into the material of strand 453 under extreme pressure forming a frictional bond independent of the cement that may be used. If proper rubber cement be used with suitable rubber in the strand 453, the brush after winding can be subjected to the required temperature conditions to vulcanize and so additionally anchor the bristles. The end of the coil element may be anchored in an angular slot 500 in the collar 443 and may be serrated for engagement with a serrated plate for this purpose, the slot 500 being preferably tapered slightly as shown.

Fig. 23 is a fragmentary longitudinal section through a brush made with the equipment and in the manner of the embodiment of Figs. 18 to 22. The strand or coil element 502, which is wound between the bristles 503 upon the tubular core 504 of the brush as before may be of hard composition of rubber, or may have cotton fabric or cords bedded into it to prevent its excessive flattening out under the lateral pressure and due to its tension, so that the strand 453 of Fig. 20 may be omitted. The strand 502 may be of soft lead or it may be of ground cork, or other similar materials, cemented and moulded into such a strand, as indicated, and may have cords or fabric embedded into its structure, as may be required to give it the necessary strength according to the purpose to which the brush is to be put.

Fig. 24 is a fragmentary longitudinal section through a brush, showing a construction using a flat metallic wire strand 510 having between it and the bristles a ribbon of rubber 512, or other compressible substance, all of which can be wound as in Figs. 18 to 22. The metallic wire gives the necessary tensile strength to permit the use of a relatively soft ribbon of rubber at each side of it. Cement may or may not be used depending upon the nature of the bristles 515 and the service for which the brush is intended.

In the embodiment shown in Figs. 25 and 26, the clutch 525 has jaws 526 in which the tube 527, forming the core of the brush, is clamped to be rotated under power, as before. The direction of rotation of the tube 527 is indicated by the arrow in Fig. 26. The block 528 is free to slide on ways 529 and 530 and is held to the left or urged under pressure to the left by cables 532 and 533 which pass over pulleys and are given tension by means of weights, as before. A wire or strand 535 preferably of metal and preferably of square section with the corners slightly rounded, as shown, has one end soldered or otherwise suitably fastened at 536 to the tube 527 and wrapped about the tube helically as shown. The block 528 has a spiral face 538 about the opening or hole in the block 528 through which the tube 527 extends and is free to rotate. The bristles 540 are again sewed at 542 into a fringe and this fringe is fed under the strand or wire 535 making contact with it at 545 (Figure 25). From this point 545 the wire and fringe of the bristles advance over a curved surface to where they make contact with the tube 527 at 546. This curved surface between the points 545 and 546 forms a more acute angle with the surface of the tube 527 than would be formed if the fringe of bristles and the wire 535 were allowed to start to wrap upon the tube 527 on a line tangent with it. The more acute angle so formed at the point 546 offers less tendency for the butt ends of the bristles under the wire to creep backwards due to the tension in the wire and resulting pressure of the wire on them.

The bristles are also firmly held under the wire 535 between the points 545 and 546 and any tendency of the bristles to creep at the point 546 is resisted by the bristles clamped under the wire to the rear of that point. Between the fringe of bristles entering upon the tube 527 and the bristles of the next succeeding wrapping, is a plate 550 with an outer curved edge 552, the plate 550 being attached to the block 528 as by means of screws 553 (Figure 26). As the bristles advance from the point 545 to the point 546 their butt ends are firmly held under the wire due to its tension. The projecting ends of the bristles rest on the curved outer edge 552 of the plate 550. As they advance their projecting ends are bent more and more perpendicular to the surface of the tube 527 due to sliding along the curved edge 552 of the plate 550.

The bristles are resisted from dragging back due to their friction against the edge of the plate 550, by the stitching 560 which is outside the wire 535. This outermost stitching in the fringe of bristles causes the projecting bristles to stand out radially with respect to the axis of the tube 527 and prevents the dragging back of the ends due to their rubbing on the edge 552 of the plate 550. These outer rows of stitchings may be more loosely sewed to permit them to elongate as may be necessary due to their greater distance from the axis of the tube 527 after being wound thereon. If extreme tension develops in these outermost rows of stitching from this cause when winding, they will have a tendency to slide down the bristles to a position nearer the tube 527 which relieves the tension as there is less circumferential length close to the tube 527 than farther out. The spiral surface 538 on the block 528 is so shaped as to cause a gradual crowding of the wire laterally to hug the next winding or turn.

The formation described results in the butt ends of the bristles 540 lying horizontally between the turns of wire and the tube 527 and then outwardly between the turns of wire. This produces a double namely a radial and lateral bond or clamping action on the butt ends of the strip or fringe of bristles. Cement as desired may or may not be applied to the butt ends of the bristles. If cement be used, the fringe or bristles may be passed through an applying device such as shown in connection with Figures 18, 19 and 20 or through any other suitable or preferred cement applying device. The necessary tension is put on the wire 535 by a friction block 570 held in by springs 572 having adjusting nuts 573 on studs 574.

With some of the coarser bristles there may be some difficulty in feeding them under the wire next to the smooth tube. When such is the case, corrugated tube 527' of the section shown in Figure 31 may be employed, the corrugated surface resisting the creeping of the bristles better than does the smooth surface of the tube or the surface of the tube may be otherwise roughened or provided with any other suitable anti-slip surfacing.

Figures 27 and 28 are longitudinal detail sections showing a construction in which two wires 600 and 601 are wound on the tube 602 at one time. Wire or strand 600 makes contact with the tube 602 about 90 degrees in advance of the point where wire 601 makes contact with the surface of the tube, thus forming a channel in which the wire 602 beds the butt ends of the fringe of bristles making contact with them at such a distance from their ends as to cause the bristles to loop entirely about the three sides of the wire, thereby providing two lateral bonds and one radial bond.

In Figure 28, the wire 601' makes contact with the middle of the length of the bristles bringing both the butt and the fine ends of the bristles to the surface of the brush. The sewing in this case may have been done midway the length of the bristles 610 instead of at their butt ends.

In Figure 29, I have shown diagrammatically how the wire 600 makes contact with the tube in advance of the wire 601.

In the construction shown in Figure 30, the butt ends of the bristles 625 in the fringe are fed under the wire 626 so that the end 627 projects under the next turn of wire and is pressed down with the butt end of the next fringe turn at 628 and bound to the tube. This construction gives an added locking of the butt ends of the bristles under the wire as may be found desirable in brushes for some classes of service. This may be wound, as in Figures 25 and 26, with the exception that a channel is provided in the face of the block on the plane of the inner face of the wire to allow for the passage of the protruding part of the fringe.

In the embodiment of Figures 27, 28 and 30 the end of the brush may be finished by continuing the winding of the wires without feeding bristles and then soldering the end turns of the wire together while the wire is still under tension and before cutting free from the source of supply.

Where a square wire is used, as in Figures 27, 28 and 30 I find that in winding, because of the tension of the outer surface and the compression in the inner surface, the wire departs from its true square section and becomes wider at the base and narrower at the outer surface. Also the area between the outer surfaces of the turns of the coil element is greater than the area between the bases of the turns, because of the greater distance from the axis. To compensate for this distortion in the wire and the fact that the bristles take up less longitudinal space I employ where necessary a wire of the general cross section shown in Figure 32. In this case 700 indicates the outer surface of the wire and 702 the narrower inner surface, these being proportioned to give the desired cross section after winding.

I do not intend, of course, to be limited to the precise details and steps shown and described.

I claim:

1. In a brush making machine, the combination of a core rotating element, means for supplying a strand for the formation of a coil, means for feeding bristles between the turns of the coil in the rotation of the core, drive means for said rotating element and said bristle feeding means and means for varying the relative speeds of said rotating element and said bristle feeding means.

2. In combination a rotating element adapted to receive and rotate a brush core, means for supplying bristles and a strand to said core for the formation of a brush coil on said core, said means including a slidable block, and means for urging said block against the coil strands to maintain lateral compression on the turns of the strand on the core.

3. In combination a rotating element adapted to receive and rotate a brush core, means for supplying a strand to said core for the formation of a coil upon the core, means for feeding bristles between the turns of the binding strand, and means for applying a binding substance to said bristles.

4. In a brush making machine, the combination of a supporting bed, a block slidably mounted thereon, means for urging said block along said bed, rotating means adapted to support a core extending in the direction of movement of the block, said block having means for leading a strand to the core to wind same thereon, means for feeding bristles between the turns of the strands, and means for applying a binding substance to the strand, said block contacting with the adjacent end of the wound strand and exerting constant pressure thereon.

5. In a brush making machine, a rotating element adapted to receive a brush core, a slidable block, means for directing a strand from the block onto said core to be wound thereon helically, means in the path of the strand for applying a binding substance thereto, means for feeding bristles between the turns of the strand, and a pump driven synchronously with the operation of the rotating element for supplying the binding substance to said means.

6. In a brush making machine, a rotative element adapted to receive a brush core, a slidable block, means for directing a strand from the block onto said element, means for feeding bristles to the coiled strand, a well in the block in the path of the strand for applying a binding substance thereto, a pump driven synchronously with the operation of the rotating element for supplying the binding substance to said well, and means for adjusting said supply.

7. In combination, a rotating element adapted to receive and rotate a brush core, a slidable block, means for supplying bristles and a strand through the block onto the core, means in the path of the strand for applying a binding substance thereto, means for supplying the binding substance to said last means synchronously with the operation of the winding element, said last means comprising a reservoir carried by the block, a pump carried by the block and driven by the winding element drive means, a supply line from the pump to said well means, and a by-pass in the supply line from the pump back to the reservoir.

8. In a brush making machine, the combination of a supporting bed, a block slidably mounted thereon, means for urging said block in one direction along said bed, rotary means for supporting a brush core in the path of the block, said block being provided with means to guide a strand onto said core and with means bearing against the coiled strand overcoming said urging means, means on the block for feeding bristles between the turns of the strand on the core, and means in the path of the bristles for applying a binding substance thereto.

9. In a brush making machine, a supporting bed, having means for supporting a core, a driving spindle for the core, a chuck having driving engagement with said core, a block slidably mounted on the bed and having an opening through which the core extends, said block having means for supplying a strand to the core, means for anchoring the strand for winding helically upon said core during rotation thereof, means for feeding bristles between the strands on the core, and yielding means urging the block toward the coil, the block having a portion contacting with the adjacent end of the coil and exerting constant pressure thereon during formation of strands on the core.

10. In a brush making machine, a supporting bed, a driving spindle, means for rotating a core element to wind a strand thereon, a block slidably mounted on the bed and having an opening through which the core element extends, said block having means for supplying a strand to said core, means for anchoring the strand for winding helically upon the core during rotation thereof, means for feeding bristles between the strands of the coil, and means urging the block toward the brush core, said means comprising tension elements attached to said block, and weight means on said tension elements, the block having a portion contacting with the adjacent end of the coil during formation thereof.

11. In a brush making machine, a supporting bed, means for rotating a core element to wind a strand thereon, means for anchoring the strand for winding thereof helically upon said core during rotation thereof, a carriage slidably mounted upon the bed and having a block through which the core may extend, means for moving said block to feed the strand and bristles to said core, a bristle hopper on the carriage, and means on the carriage for feeding bristles from said hopper to a position between the turns of the strand on the core.

12. In a brush making machine, a supporting bed, a driving spindle, means for rotating a core element to wind a strand thereon, means for anchoring the strand for winding thereof helically upon the core during rotation thereof, a carriage slidably mounted upon the bed and having a block through which the core may extend and means for moving the block to feed the strand to said core, a bristle hopper on the carriage, means on the carriage for feeding bristles from said hopper to a position between the turns of the strand on the core, well means on the block for applying a binding substance to the bristles in the formation of the brush, and means for preventing leakage of the binding substance.

13. In a brush making machine, a supporting bed, a block slidably mounted upon said bed, yielding means for urging said block along said bed in one direction, means for supplying bristles and a strand for the formation of a brush coil in the path of movement of the block in said direction with the block pressing against the adjacent end of the coil during formation thereof, means for supplying a strand through the block to said winding means, a cement well in the block in the path of travel of the strand, and an arm hugging the strand to wipe the same.

14. In a brush making machine, a supporting bed, a block slidably mounted thereon, yielding means for urging said block along said bed in one direction, means for supplying bristles and a strand for the formation of a brush coil in the path of movement of the block in said direction with the block pressing against the adjacent end of the coil during formation thereof, means for supplying a strand through the block to said winding means, a cement well in the block in the path of the strand, an arm hugging the strand to wipe same, said arm being pivoted, and a spring urging said arm into engagement with said strand.

15. In a brush making machine, a supporting bed, a driving spindle, means for drivingly connecting a brush core with said spindle, a block slidably mounted upon the bed, said block having an opening through which the core may extend and a helical surface formed in the inner face of said block about said opening, and means for feeding bristles to the brush core along the helical surface.

16. In a brush making machine, a supporting bed, a driving spindle, means for drivingly connecting a brush core with said spindle, a block slidably mounted upon the bed, said block having an opening through which the core may extend and a helical surface formed in the inner face of said block about said opening, the inlet slope of said surface being greater to increase the size of inlet thereto, and means for feeding bristles to the brush core along the helical surface.

17. In a brush making machine, a rotating element for rotating a core, means for supplying a strand to the core, toothed members for feeding bristles between the turns of the strand, a well in the path of movement of the bristles for applying a binding substance to the bristles, and an arm hugging the strand to wipe same, said arm having recessed portions terminating short of the teeth on said feed members to provide pockets communicating with said well.

18. In a brush making machine, the combination of a supporting bed, a block slidably mounted thereon, means for urging said block along said bed in one direction, means for rotating a brush core in the path of movement of said block, means for conducting a strand through said block to the core, said block having a helical surface on the side next the rotating means, adapted to engage the coiled strand for crowding the turns laterally, said helical surface having a portion of greater pitch than the remainder and forming an admission throat, and means for feeding bristles through said throat to position between the coil turns in the winding of the brush.

19. In a brush making machine, means for supporting and rotating a brush core, means for conducting a bristle supporting and securing member onto the core helically, means for feeding bristles between the convolutions of the helix as it is formed, and means subjecting said helix to continuous pressure during winding thereof in the direction of the axis of the helix.

20. In a brush making machine, means for supporting and rotating a brush core, means for conducting a bristle supporting and securing member onto the core to be wound helically thereon, means for continuously feeding bristles under uniform pressure between the convolutions of the helix as it is formed, and means subjecting said member to continuous pressure during winding thereof and in the direction of the axis of the helix produced.

21. In a brush making machine, means for supporting and rotating a core, means for directing a bristle supporting and securing member onto said core helically to form a brush coil and for subjecting said coil to continuous pressure in the direction of its axis during formation thereof, and means for feeding bristles between the windings of the coil as it is formed.

22. In a brush making machine, means for supporting and rotating a core, means for winding a brush coil helically upon said core and under continuous axial pressure during formation thereof, and means for feeding bristles between the turns of the coil during winding of the same.

In witness whereof, I hereunto subscribe my name this 27th day of April, 1925.

ARNOLD A. ANGELL.